(12) United States Patent
Wang

(10) Patent No.: US 9,497,439 B2
(45) Date of Patent: Nov. 15, 2016

(54) APPARATUS AND METHOD FOR FAST MULTIVIEW VIDEO CODING

(71) Applicant: ATI TECHNOLOGIES ULC, Markham, Ontario (CA)

(72) Inventor: Jiao Wang, Richmond Hill (CA)

(73) Assignee: ATI Technologies ULC, Markham (CA)

( * ) Notice: Subject to any disclaimer, the term of this patent is extended or adjusted under 35 U.S.C. 154(b) by 579 days.

(21) Appl. No.: 13/942,280

(22) Filed: Jul. 15, 2013

(65) Prior Publication Data

US 2015/0016528 A1 Jan. 15, 2015

(51) Int. Cl.
*H04N 19/51* (2014.01)
*H04N 13/00* (2006.01)
*H04N 19/597* (2014.01)
*H04N 19/53* (2014.01)

(52) U.S. Cl.
CPC .......... *H04N 13/0048* (2013.01); *H04N 19/53* (2014.11); *H04N 19/597* (2014.11)

(58) Field of Classification Search
None
See application file for complete search history.

(56) References Cited

U.S. PATENT DOCUMENTS

| | | | | |
|---|---|---|---|---|
| 2009/0087096 A1* | 4/2009 | Eaton | ................ | G06K 9/38 382/190 |
| 2009/0190038 A1* | 7/2009 | Lin | ................ | H04N 19/513 348/699 |
| 2010/0215251 A1* | 8/2010 | Klein Gunnewiek | ........ | H04N 13/0022 382/154 |
| 2010/0220789 A1* | 9/2010 | Yuwen | ................ | H04N 19/61 375/240.16 |
| 2011/0142132 A1* | 6/2011 | Tourapis | ............. | H04N 19/597 375/240.16 |
| 2011/0268193 A1* | 11/2011 | Cho | ................ | H04N 19/597 375/240.25 |
| 2011/0286530 A1* | 11/2011 | Tian | ................ | H04N 21/2365 375/240.25 |
| 2012/0320966 A1* | 12/2012 | Guo | ................ | H04N 5/46 375/240.02 |
| 2013/0038686 A1* | 2/2013 | Chen | ................ | H04N 19/597 348/43 |
| 2013/0169755 A1* | 7/2013 | Choo | ................ | H04N 13/0497 348/46 |
| 2013/0195169 A1* | 8/2013 | Jang | ................ | H04N 19/00424 375/240.02 |
| 2014/0015922 A1* | 1/2014 | Zhang | ................ | H04N 19/56 348/43 |
| 2014/0133567 A1* | 5/2014 | Rusanovskyy | ...... | H04N 19/159 375/240.16 |

FOREIGN PATENT DOCUMENTS

EP 2373046 * 10/2011

* cited by examiner

*Primary Examiner* — Frederick Bailey

(74) *Attorney, Agent, or Firm* — Faegre Baker Daniels LLP

(57) ABSTRACT

Generally, an apparatus and a method for encoding multiview video downscale two views of the multiview video, determine a shift between the downscaled views, and encode one the two views using the shift.

27 Claims, 8 Drawing Sheets

APPARATUS AND METHOD FOR FAST MULTIVIEW VIDEO CODING

BACKGROUND OF THE DISCLOSURE

The disclosure relates generally to an apparatus and a method for multiview video coding.

Multiview video coding (MVC) is a technique for efficiently compressing view sequences captured simultaneously from multiple cameras, referred to as the multiview (MV) source, using a single video stream. The images of the views captured at a single temporal location may be referred to as a MV image. The MV image may be defined as a group including a base view and one or more spatially referenced views. Since views in the sequences include portions of the same scene, the view sequences include many temporal and spatial statistical dependencies. The MV sequences thus may include many temporally and spatially referenced views. Consequently, a MV image may be efficiently encoded by determining the relative motion between a reference image, e.g., the base view, and the temporally and spatially referenced views. The relative motion may be expressed as a motion shift and represented as a motion vector, for example. Multiview video coding is also applicable for coding free viewpoint video streams.

FIG. 1 is a schematic representation of a multiview source including three cameras configured to capture views of a scene including objects A and B. Each camera comprises an image plane (100, 110, 120), an optical axis (102, 112, 122) perpendicular to the respective image plane, and a view angle (104, 114, 124). At the intersection of the image plane and the optical axis is the optical center of the camera. The optical centers are at different positions (location and/or orientation) in space relative to an orthogonal coordinate system having coordinates X, Y, and Z.

FIG. 2 is a graph illustrating the relationship between the images of a multiview video stream in space and time. On the horizontal axis of the graph are depicted three points in time (1, 2, 3). Three layers are depicted on the vertical axis to represent the views captured by the cameras discussed with reference to FIG. 1. The base layer includes images named base 1, base 2, and base 3. Spatially dependent layer 1 includes images named, respectively, spatially dependent images 1,1, 1,2, and 1,3. Spatially dependent layer 2 includes images named, respectively, spatially dependent images 2,1, 2,2, and 2,3. Exhaustive macroblock (MB) searches can be conducted to determine shifts in order to encode the three views. The arrows connecting the images represent comparisons performed in the exhaustive search. For example, line 202 represents a comparison between images base image 3 and spatially dependent image 1,3 to determine an inter-view motion shift between them (this is referred to as an "inter-view motion shift" as the motion shift is measured between images that are related to the same temporal location or point in time; intra-view motion shift is the motion shift between images that are not all from the same temporal location or point in time). Line 204 represents a comparison between images spatially dependent image 1,2 and spatially dependent image 1,3 to determine a temporal shift between them (i.e., an intra-view motion shift). The purpose of the exhaustive MB search is to match macroblocks in the reference image and the dependent image, where the best match is the one exhibiting the least distortion. The exhaustive MB search uses a number of search modes, reference frames, variable MB sizes, directions of prediction and search ranges to find the best match. Thus, for an encoder that supports two layers, the exhaustive search will be performed at least twice (at least once for an inter-view motion (or spatial) shift and at least once for an intra-view motion (or temporal) shift) for each macroblock in the dependent views. Because multiview video produces a large amount of data, the exhaustive MB search is very complex and expensive in terms of processor cycles and time, and therefore power, and limits the ability to multiview encode in real time, particularly with battery powered devices.

A need exists to reduce multiview video encoding costs, including time, processing and power, and to do so while retaining good visual quality of the resulting multiview video.

SUMMARY OF EMBODIMENTS OF THE DISCLOSURE

Embodiments of a method and an apparatus for multiview video coding are disclosed herein. In one embodiment, the method includes downscaling two views of a multiview video; determining a shift between the two downscaled views; and encoding one of the two views using the shift. In one variation thereof, the two views include a base view and a spatially dependent view of a multiview image, and encoding one of the two views using the shift includes encoding the spatially dependent view using the shift. In another variation thereof, the two views include a view from a multiview image and a view from a preceding multiview image.

In another variation thereof, the method further includes receiving a mode command from a user and transmitting a mode signal based on the mode command to select between a fast motion search logic and another motion search logic, the fast motion search logic configured to downscale the two views, determine the shift between the two downscaled views, and upscale the shift, wherein the fast motion search logic requires less power than the another motion search logic. In a further variation thereof, the shift comprises an inter-view shift, and the method further includes downscaling a preceding view from a preceding multiview image, determining a predicted shift between the downscaled preceding view and one of the two downscaled views, and determining an optimal shift between the inter-view shift and the predicted shift, where encoding one of the two views using the shift includes encoding one of the two views using the optimal shift. In a yet further variation thereof, the shift comprises an inter-view shift, and the method further includes identifying co-located areas of the two views using the inter-view shift, and identifying a corresponding co-located area of a downscaled preceding view of a preceding multiview image. In still another variation thereof, the method includes upscaling the inter-view shift; identifying co-located areas of the two views using the upscaled shift; comparing pixels of the co-located areas in a first comparison, shifting one of the co-located areas by a predetermined shift amount; comparing pixels of the other of the co-located areas to pixels of the shifted co-located area in a second comparison; and refining the upscaled shift with the predetermined shift amount if the second comparison results in less residue than the first comparison.

In a further variation, the method includes obtaining, with a multiview source device, the multiview video. In one example, the multiview device includes a display device and a user interface, and the method further includes receiving a mode command with the user interface and, responsive to the mode command, encoding the multiview video with one of fast motion search logic and another motion search logic, where the fast motion search logic downscales the two views, determines the shift between the two downscaled views, and encodes one of the tow views using the shift.

In another embodiment, the method includes downscaling a reference view and a dependent view of a multiview image; determining a shift between the downscaled reference view and the downscaled dependent view; and encoding the dependent view using the shift. In one variation of the present embodiment, the method further includes generating an upscaled shift by upscaling the shift between the downscaled reference view and the downscaled dependent view before encoding the dependent view.

In one example, the method further includes receiving a mode command from a user and transmitting a mode signal based on the mode command to select between fast motion search logic and another motion search logic, the fast motion search logic configured to downscale the reference view and the dependent view, determine the shift between the downscaled reference view and the downscaled dependent view, and upscale the shift, wherein the fast motion search logic requires less power than the another motion search logic. In another example, the reference view is a base view, and the method further includes determining a predicted shift between a preceding spatially dependent view and the dependent view, and determining an optimal shift between the upscaled shift and the predicted shift, wherein encoding the dependent view using the shift includes encoding the dependent view using the optimal shift. In a further example, the method includes comparing pixels of a dependent view area of the dependent view to pixels of a reference view area of the reference view which is co-located with the dependent view area, shifting the reference view area by a predetermined shift amount, comparing pixels of the dependent view area to pixels of the shifted reference view area, and refining the upscaled shift with the predetermined shift amount if the pixel comparison of the shifted reference view area and the dependent view area results in less residue than the pixel comparison of the reference view area and the dependent view area.

In another variation of the present embodiment, the method further includes obtaining, with a multiview source device, a multiview video including the multiview image. In one example, wherein the multiview device includes a display device and a user interface, the method further includes receiving a mode command with the user interface and, responsive to the mode command, encoding the multiview video with one of fast motion search logic and another motion search logic, wherein the fast motion search logic determines the shift between the downscaled reference view and the downscaled dependent view and encodes the dependent view using the shift.

In a further embodiment, an apparatus for encoding multiview video includes fast motion search logic operable to downscale a reference view and a dependent view of a multiview image and determine a shift between the downscaled reference view and the downscaled dependent view; and an encoder logic operable to encode the dependent view using the shift.

In one variation of the present embodiment, the apparatus includes an integrated circuit, and the fast motion search logic is included in the integrated circuit. In another variation of the present embodiment, the apparatus further includes a user interface configured to receive a mode command from a user and select, responsive to the mode command, between the fast motion search logic and another motion search logic, the fast motion search logic consuming less power than the another motion search logic. In a further variation of the present embodiment, the apparatus further includes a motion vector upscaler configured to generate an upscaled shift by upscaling the shift. In one example, the reference view is a base view, and the fast motion search logic is configured to determine a predicted shift between a preceding spatially dependent view and the dependent view, and determine an optimal shift between the upscaled shift and the predicted shift, wherein the encoding logic is configured to encode the dependent view using the optimal shift. In another example, the apparatus includes a motion vector refiner configured to refine the upscaled shift to improve the quality of the encoded dependent view. In a further variation of the present embodiment, the apparatus includes a multiview source device operable to capture or generate multiview video including the multiview image. In one example, the multiview source device is selected from a group comprising a computing device, a video camera, an automobile safety camera, a security system, a tablet, a smart phone, a gaming console, a video conferencing system, a television set top box, and an apparatus capable of receiving or generating video.

In a yet further embodiment, an integrated circuit for use in encoding a multiview video includes fast motion search logic operable to downscale a reference view and a dependent view of the multiview image and determine a shift between the downscaled reference view and the downscaled dependent view. In one variation of the present embodiment, the integrated circuit includes a motion vector upscaler configured to generate an upscaled shift by upscaling the shift. In one example, the reference view is a base view, and the fast motion search logic is configured to determine a predicted shift between a preceding spatially dependent view and the dependent view, and determine an optimal shift between the upscaled shift and the predicted shift, the optimal shift being operable to encode the dependent view. In another variation of the present embodiment, the integrated circuit includes a motion vector refiner configured to refine the upscaled shift to improve the quality of the encoded dependent view. In one example, the motion vector refiner is configured to compare pixels of a dependent view area of the dependent view to pixels of a reference view area of the reference view which is co-located with the dependent view area, shift the reference view area by a predetermined shift amount, compare pixels of the reference view area to pixels of the dependent view area, and refine the upscaled shift with the predetermined shift amount if the pixel comparison of the shifted reference view area and the dependent view area results in less residue than the pixel comparison of the reference view area and the dependent view area. In yet another variation of the present embodiment, the integrated circuit includes an imaging sensor operable to capture multiview video including the multiview image.

In a still further embodiment, a non-transitory computer readable medium includes executable instructions that when executed by an integrated circuit fabrication system, cause the integrated circuit fabrication system to produce an integrated circuit that includes fast motion search logic operable to downscale a reference view and a dependent view of a multiview image and determine a shift between the downscaled reference view and the downscaled dependent view. In a variation of the present embodiment, the integrated circuit includes a motion vector upscaler configured to generate an upscaled shift by upscaling the shift. In one example, the reference view is a base view, and the fast motion search logic is configured to determine a predicted shift between a preceding spatially dependent view and the dependent view, and determine an optimal shift between the upscaled shift and the predicted shift, the optimal shift being operable to encode the dependent view. In another example, the fast motion search logic is further configured to identify a base view area of the base view co-located with a dependent view area of the dependent view using the upscaled shift, determine motion vectors of macroblocks of the base view area relative to a preceding base view, and determine the shift prediction by averaging the macroblock motion vectors. In another variation of the present embodiment, the integrated circuit includes a motion vector refiner configured to refine the upscaled shift to improve the quality of the encoded dependent view. In one example, the motion vector refiner is configured to compare pixels of a dependent view area of the dependent view to pixels of a reference view area of the reference view which is co-located with the dependent view area, shift the reference view area by a predetermined shift amount, compare pixels of the reference view area to pixels of the dependent view area, and refine the upscaled shift with the predetermined shift amount if the pixel comparison of the shifted reference view area and the dependent view area results in less residue than the pixel comparison of the reference view area and the dependent view area. In another example, the motion vector refiner is configured to compare only pixels located near corners of the dependent view area to determine the residue.

BRIEF DESCRIPTION OF THE DRAWINGS

The above-mentioned and other disclosed features, and the manner of attaining them, will become more apparent and will be better understood by reference to the following description of disclosed embodiments taken in conjunction with the accompanying drawings, wherein.

Figure 1:
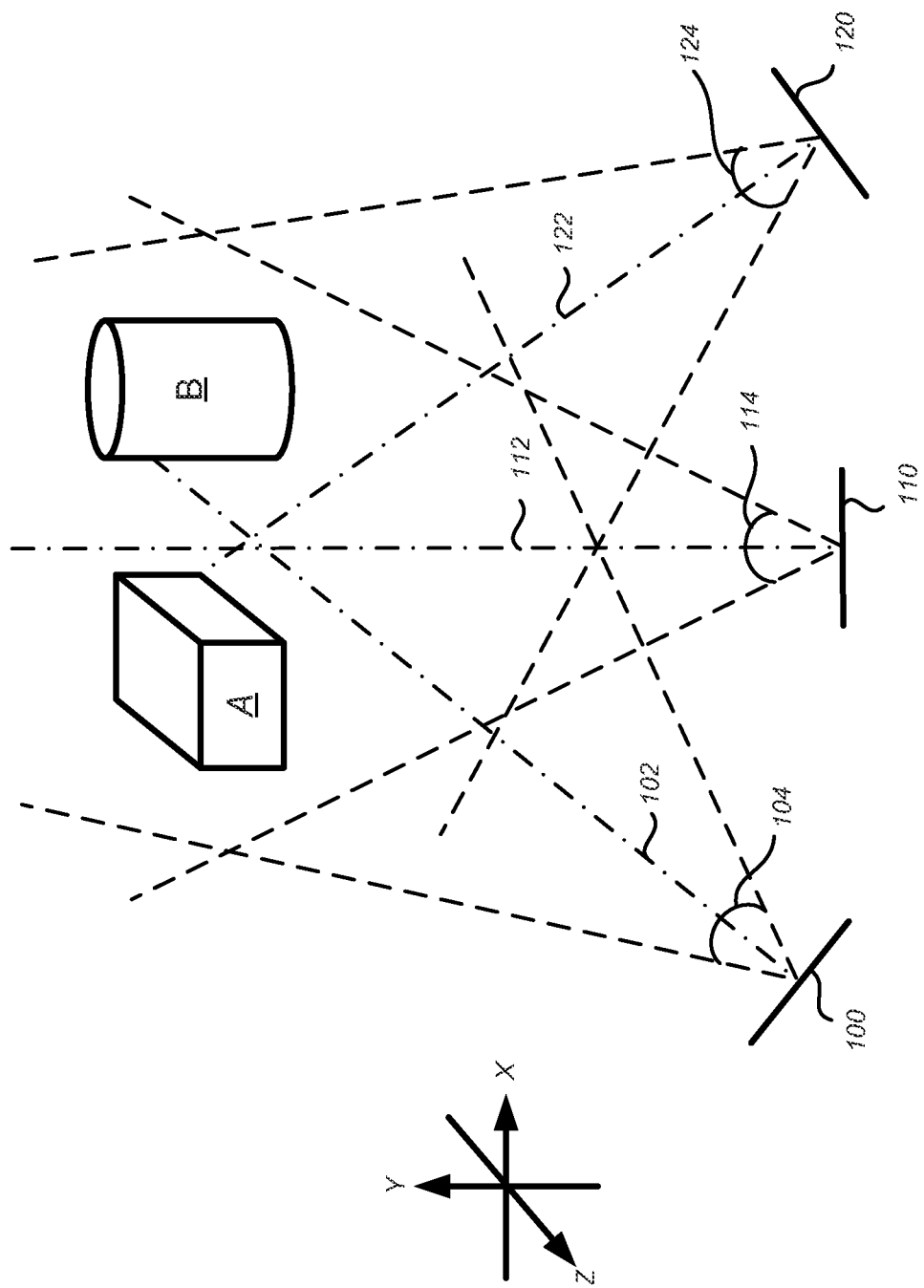
FIG. 1 is a schematic diagram illustrating a scene relative to a multiview source configured to capture multiview video of the scene.
Figure 2:
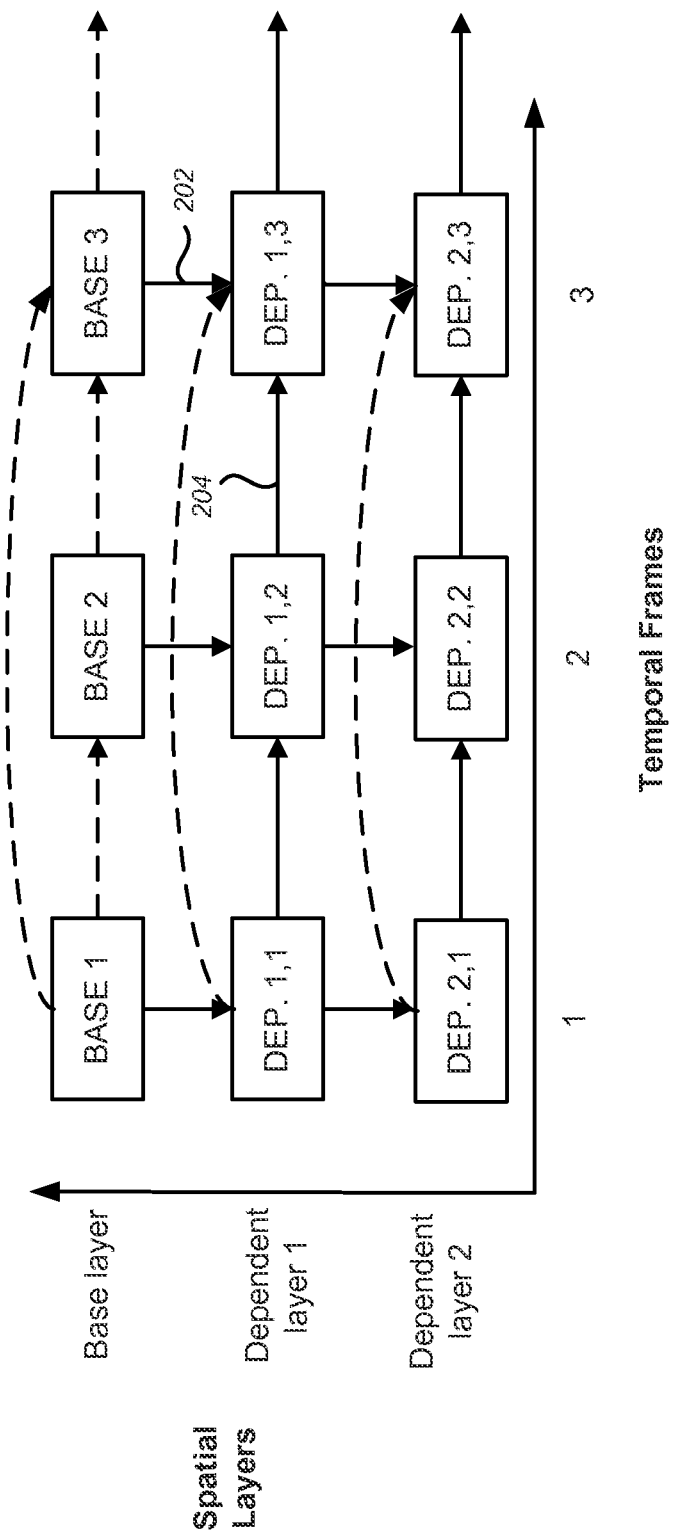
FIG. 2 is a graph illustrating the spatial and temporal organization of the multiview video.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present invention. The exemplification set out herein illustrates embodiments of the disclosure, and such exemplifications are not to be construed as limiting the scope of the invention in any manner.

DETAILED DESCRIPTION

Briefly, multiview video includes sequences of multiview images. The sequences include preceding and succeeding multiview images. A multiview image can be thought of as a group of images obtained at a single temporal location from different views. Before or as part of the encoding process, views are compared to search for motion shifts, or shifts, between them. Rather than comparing the original views (i.e., not scaled or otherwise modified), the shifts are determined from downscaled views. Thus, the original views are downscaled, and then the shifts are determined by comparing the downscaled views, or portions of the downscaled views. Because the downscaled views are smaller, motion shift searches are faster and consume less power. Some views are then encoded using the shifts, to produce video that is compressed relative to the original video.

As mentioned above, views in the sequences can be encoded with reference to other views. Views encoded with reference to other views are dependent views, and views referenced by other views are reference views. The dependence of a dependent view relative to a reference view may be temporal, spatial or both. The dependence may be on a base view/layer or another dependent view/layer. Additionally, the dependence between two views may include dependence between a dependent view and a base view from a different temporal location. Furthermore, for dependent views that have both spatial and temporal dependencies, those dependencies do not necessarily reference (or depend on) the same reference view.

Among other advantages, the above-mentioned and other disclosed features which characterize the embodiments of the apparatus and method described herein advantageously make real-time multiview video encoding feasible. Further, the disclosed features enable multiview video encoding in mobile devices. In some embodiments, a user may use a user interface to select between the fast motion search, to save power for example, and another motion search.

The fast motion search may be performed by an integrated circuit. Integrated circuits include processing units and application specific integrated circuits (ASIC). Exemplary processing units include an accelerated processing unit, a graphics processing unit and a central processing unit. The processing units may execute instructions which may be firmware or software.

The integrated circuits may be included in any number application specific or general apparatus. Exemplary apparatus include computers, tablets, smart phones, gaming consoles, video conferencing systems, television set top boxes, video cameras, and any other device capable of receiving or generating video. The fast motion search may be optional. A user may select with a user interface whether to activate the fast motion search or to utilize a traditional or exhaustive motion search instead.

One or more other technical advantages may be readily apparent to those skilled in the art from the figures, descriptions, and claims included herein. Moreover, while specific advantages have been enumerated above, various embodiments may include all, some or none of the enumerated advantages.

Reference will now be made to the embodiments illustrated in the drawings, which are described below. The foregoing examples and embodiments, and those disclosed below, are not intended to be exhaustive or limit the claims to the precise form disclosed in the following detailed description. Rather, the embodiments are chosen and described so that others skilled in the art may utilize their teachings. Further, the transitional term "comprising", which is synonymous with "including," or "containing," is inclusive or open-ended and does not exclude additional, unspecified elements or method steps. By contrast, the transitional term "consisting" is a closed term which does not permit addition of unspecified terms.

A MVC encoding process as described herein may support one or more reference view images. In one embodiment, the method includes downscaling two views of a multiview video. The views can comprise base and dependent views of a MV image, for example. The views can also comprise views from preceding and succeeding MV images, such as a base view and a preceding base view.

Figure 3:
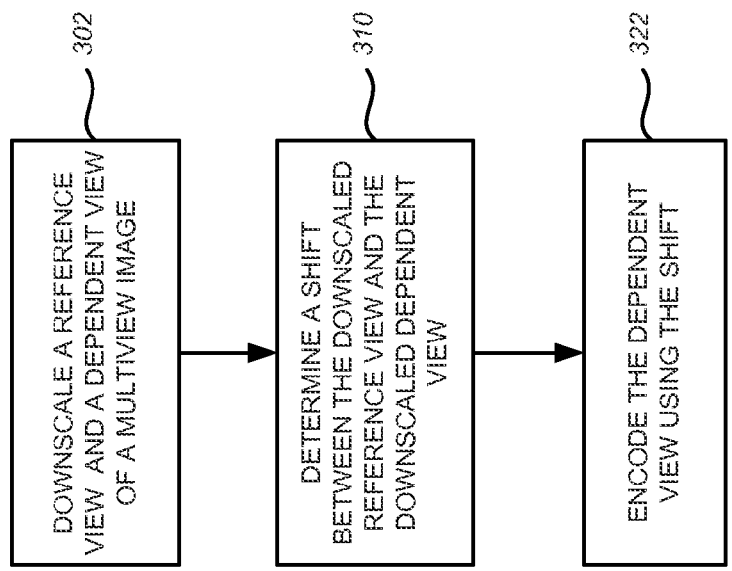
FIG. 3 is a flowchart of a method for determining a shift between a base view and a dependent view of a multiview video in accordance with one example set forth in the disclosure.

In embodiments described with reference to FIG. 3, a motion search is performed with a downscaled version of the MV image to find a motion shift, and the motion shift is then used to encode the original MV image. Searching a downscaled MV image is faster than searching the original MV image so it requires less power. For pedagogical purposes, the embodiment will be described in connection with base views and dependent views, wherein the base views are images, or pictures, taken by a base view camera, and the dependent views are images, or pictures, taken by spatially dependent view cameras. The dependent views may be spatially dependent, temporally dependent, or both spatially and temporally dependent, according to which view(s) is(are) used as reference(s). It should be understood that the present embodiment is exemplary and does not limit the scope of the invention. As described above, other reference and dependent views may be utilized in accordance with other embodiments of the disclosure. The present embodiment will now be described in more detail.

At 302, the reference view and the dependent view are downscaled by a downscale factor DF in each dimension to a fraction of their original horizontal and vertical resolution. For example, for DF=4, the views may be downscaled to ¼ of their original horizontal and vertical resolution. The downscale factor can be set to other values based on the original resolution of the MV image. The dependent view is spatially dependent relative to the base view and may also be, as described below, temporally dependent relative to a preceding view.

At 310, a shift is determined between the downscaled reference view and the downscaled dependent view. The shift determination will now be explained with reference to FIG. 4, which is a block diagram of a base view 402 and a dependent view 410 of a downscaled MV image 400. A 4×4 pixel dependent view MB 412 is shown at location D(i, j) in dependent view 410. Other MB sizes may also be used. A corresponding base view MB 412' is shown in base view 402. MB 412 and MB 412' are located in the same relative positions. A base MB 404 is also shown at location B(i+$x_i$, j+$y_j$), which represents a shift ($x_i$, $y_j$) relative to the position of MB 412' and corresponding to the best match between the contents of MB 404 and MB 412'. Without a shift, MB 404 would be superimposed on MB 412'. The search may be represented by the following expression:

$$(x_i, y_j) = \arg\min |B(i+x_i, j+y_j) - D(i,j)|$$

Referring again to FIG. 3, in the present example the original views have a width W and a height H and the downscaled views have a width W/4 and a height H/4, so i and j comprise:

$$i \in \left\{0, \ldots, \frac{W}{16} - 1\right\}$$

$$j \in \left\{0, \ldots, \frac{H}{16} - 1\right\}$$

The shift for the dependent view is obtained by computing the motion vector for each macroblock in the downscaled dependent view of the MV image, and then averaging all the motion vectors to get the average shift (Δx, Δy) between the two downscaled views. The determination of the shift may be based on the following expression:

$$(\Delta x, \Delta y) = \frac{\sum_{i=0, j=0}^{i=\frac{W}{16}-1, j=\frac{H}{16}-1} (x_i, y_j)}{(W \times H / 256)}$$

The determined shift (Δx, Δy) between the downscaled base view and the downscaled dependent view is upscaled so that it corresponds to the originally sized views. The upscaled shift, which may be referred to as the inter-view motion vector, is represented as (x, y), where x=DF*Δx and y=DF*Δy.

At 322, the originally sized dependent view is encoded using the shift. The shift may be upscaled before encoding to provide an upscaled shift or encoding may be based on the downscaled shift and the downscale factor. A known or future developed MVC encoding protocol may be used to encode the MV images. The encoded MV video stream may then be transmitted to a decoder to be decoded and, subsequently, displayed.

Figure 4:
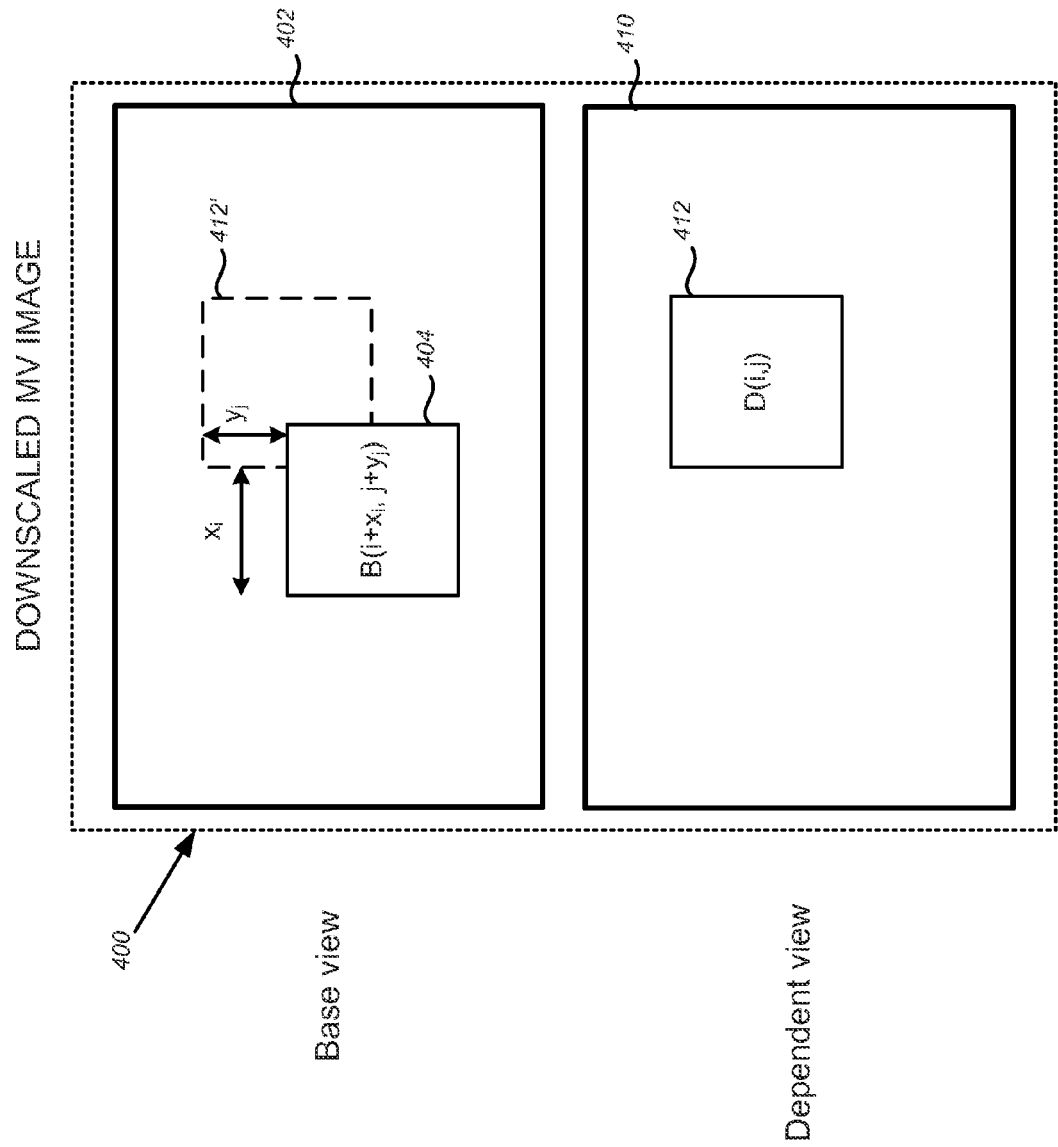
FIG. 4 is a block diagram illustrating a motion shift between a base view and a dependent view of a multiview image in accordance with another example set forth in the disclosure.

In another embodiment, a predicted motion vector (px, py) may be determined by performing a fast motion search in the manner discussed with reference to FIGS. 3 and 4 between a view from a preceding MV image and a view from succeeding MV image. In other words, the fast motion search is performed between temporally referenced views. In one example, the view from the preceding MV image is referred to as dependent view (n−1) (which is spatially dependent with respect to the preceding base view), functioning as a reference view, and the view from the succeeding MV image is referred to as dependent view (n) (which is spatially dependent with respect to the succeeding base view and temporally dependent with respect to the preceding dependent view). The predicted motion vector is an intra-view motion vector.

In one embodiment, the method is configured to refine the shift and thus improve encoding quality. In the present embodiment, the method includes upscaling the shift; identifying co-located areas of the two views using the upscaled shift; comparing pixels of the co-located areas in a first comparison, shifting one of the co-located areas by a predetermined shift amount; comparing pixels of the other of the co-located areas to pixels of the shifted co-located area in a second comparison; and refining the upscaled shift with the predetermined shift amount if the second comparison results in less residue than the first comparison. An integrated circuit may include a motion vector refiner component including logic configured to implement the foregoing embodiment of the method.

In one variation of the present embodiment, inter-view and intra-view motion vectors are both determined and used to identify, based on an area of a dependent view (n), co-located areas of reference views to which dependent view (n) is temporally and spatially referenced. The pixels in the co-located areas are compared to the pixels of the dependent view (n) area to determine which of the two reference view areas best matches the dependent view (n) area. The best match is the match with the least error, or residue. The motion vector resulting in the least residue is used to encode dependent view (n).

In another variation of the present embodiment, a motion vector to encode a dependent view (n) is selected between a predicted motion vector (px, py) and an inter-view motion vector (x, y). In the present embodiment, the predicted motion vector (px, py) and the inter-view motion vector (x, y) are both determined and used to identify, based on an area of the dependent view (n), co-located areas of the corresponding dependent view (n−1) and base view (n). The pixels in the corresponding co-located reference view areas are compared to the pixels of the dependent view (n) area to determine which of the two reference view areas best matches the dependent view (n) area. The motion vector corresponding to the co-located reference view area that results in the best match, which may be referred to as the optimal motion vector, is used to encode the dependent view (n). The determination of the optimal motion vector is described below in more detail with reference to FIG. 5.

Figure 5:
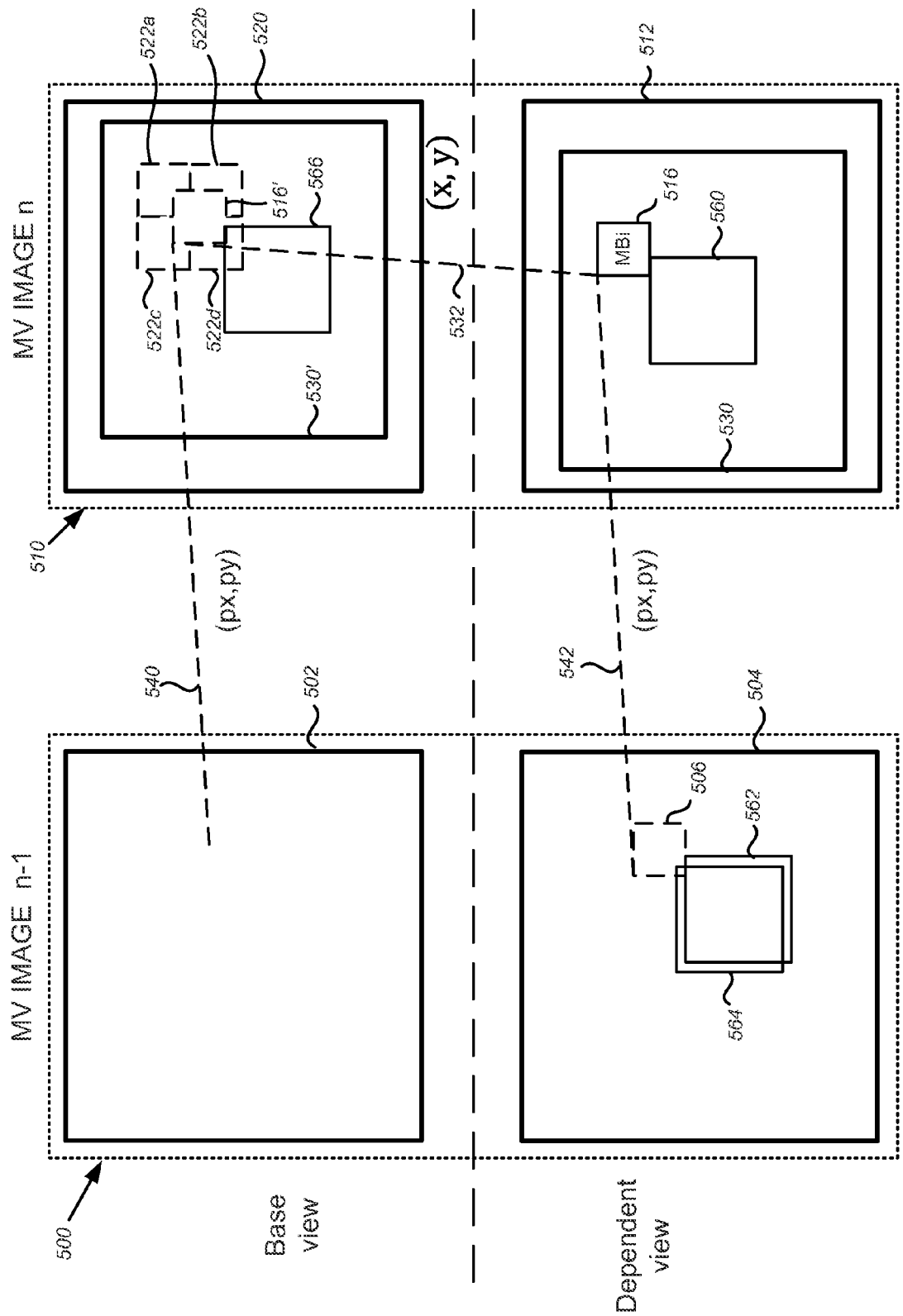
FIG. 5 is a block diagram illustrating temporal and inter-view shifts between base and dependent views of multiview video in accordance with another example set forth in the disclosure.

FIG. 5 is a block diagram illustrating another embodiment of a fast search method. In the present embodiment, the inter-view motion vector (x, y), illustrated as line 532, is first computed in the manner discussed with reference to FIGS. 3 and 4 (e.g. performing a fast motion search of downscaled views and upscaling the shift). Vector (x, y) is then used to find a co-located area between the originally sized base view and dependent view of a MV image. The search method will be described with reference to a MV image 510 taken at time n comprising a base view 520, including an area 516', and a dependent view 512, including a MB 516i, and a MV image 500 taken at time n−1, comprising a base view 502 and a spatially dependent view 504, including a MB 506. First, the co-located area of dependent view 512 and base view 520, denoted respectively by numerals 530 and 530', will be found by finding the co-located area of each MBi. Since the MB co-located areas might not match exactly, a dependent view MB may partially overlap multiple base view MBs. This is illustrated in FIG. 5, where area 516', corresponding to MBi 516, partially covers four macroblocks in base view 520, illustratively MB 522a, MB 522b, MB 522c and MB 522d.

Having found co-located areas of the base and dependent views taken at time n, the motion vectors of each MB in the co-located area of base view 520 (n) relative to base view 502 (n−1), can be determined. These motion vectors, illustratively motion vectors (x1, y1), (x2, y2), (x3, y3), and (x4, y4) corresponding to MB 522a, MB 522b, MB 522c and MB 522d, are averaged to obtain the predicted motion vector (px, py), illustrated as line 540, between base views 502 and 520. The predicted motion vector (px, py) can be computed for four macroblocks as follows:

$$px = \frac{\sum_{i=1}^{4} x_i}{4}$$

$$py = \frac{\sum_{i=1}^{4} y_i}{4}$$

Of course, the predicted motion vector (px, py) may be determined by averaging all the MBs in the co-located area. Alternatively, the predicted motion vector (px, py) may be determined by averaging a representative number of MBs. In another example, the median of the predictions, rather than the average, is used to obtain the predicted motion vector (px, py). The motion vectors for each MB between base view 502 and base view 520 may be determined in a traditional manner. Alternatively, the motion vectors may be determined by performing a fast search of downscaled views as discussed with reference to FIG. 3.

A co-located area of spatially dependent view 504 (n−1) may now be determined based on the predicted motion vector (px, py) computed for base view 502 (n−1), illustrated as line 542. By utilizing the predicted motion vector (px, py) computed from the base views, an additional motion search can be avoided. Alternatively, the predicted motion vector between spatially dependent view 504 (n−1) and dependent view 512 (n) may be determined in a traditional manner or by performing a fast search of downscaled views as discussed with reference to FIG. 3. As explained above, the co-located areas between reference views (base view (n) or dependent view (n−1)) and a dependent view (n) can be found based on the known base view predicted motion vector (px, py) using the fast search method without performing an exhaustive search.

In a variation of the present embodiment, a small motion refinement is performed by shifting a reference view area in the reference view, which is co-located with a dependent view area in the dependent view, a predetermined shift amount from an unshifted location to a shifted location, and then comparing pixels in the dependent view area to corresponding pixels in the reference view area at both the shifted and unshifted locations to determine which comparison has the least residue. As used in the present disclosure, pixels include subpixels. If the shifted location comparison results in the least residue, the motion vector is refined by the predetermined shift amount. If the unshifted location comparison results in the least residue, the motion vector is not changed. The reference view area may comprise a MB, a multitude of MBs or even the entire co-located area between the reference view and the dependent view. The reference view area may be centered on the entire co-located area between the reference view and the dependent view. The predetermined shift amount may be a fraction of a pixel, a pixel, or a few pixels. Referring to FIG. 5, a dependent view area 560 centered on co-located view area 530 is shown. A co-located unshifted reference view area 562 and a co-located shifted reference view area 564 are show on spatially dependent view 504 (n−1). Assuming MB 506 is a 4×4 MB, the shift amount, as shown, is less than a pixel. Comparisons of the pixels in unshifted reference view area 562 and shifted reference view area 564 to the pixels at dependent view area 560 will indicate which reference view area best matches the pixels of dependent view area 560, which will determine whether the predicted motion vector (px, py) should be refined. A similar refinement may be performed to determine if the inter-view vector (x, y) should be refined.

The optimal vector embodiment generally disclosed above will now be described with reference to FIG. 5. The predicted motion vector (px, py), represented by line 542, and the inter-view motion vector (x, y), represented by line 532, may be determined by performing fast motion searches in the manner discussed with reference to FIGS. 3 and 4 between spatially dependent view 504 (n−1) and base view 520 (n), functioning as a reference views, and dependent view 512 (n). Thus, view 512 (n) is spatially dependent with respect to view 520 (n) and temporally dependent with respect to view 504 (n−1). A comparison of the pixels in dependent view area 560 relative to co-located unshifted reference view area 562 is performed to compute the predicted motion residue. A comparison of the pixels in dependent view area 560 relative to co-located reference view area 566 is performed to compute the inter-view motion residue. The optimal motion vector is the motion vector corresponding to the reference view area that results in the least residue.

Figure 6:
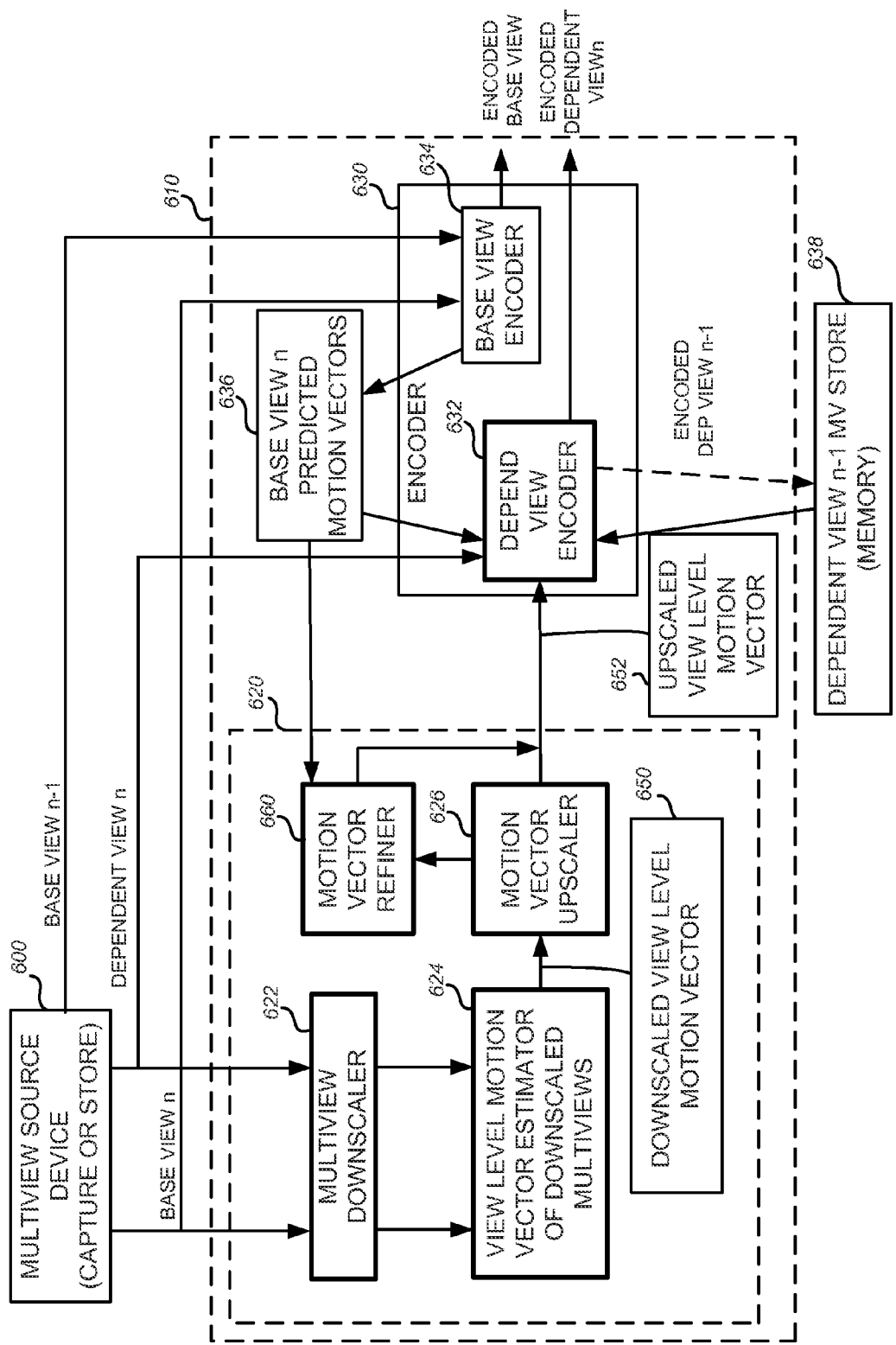
FIG. 6 is a block diagram illustrating logic for determining shifts and encoding multiview video in accordance with another example set forth in the disclosure.

FIG. 6 is a block diagram illustrating an embodiment of fast motion search and encoding logic 610 for determining shifts and encoding MV images. Fast motion search and encoding logic 610 includes fast motion search logic 620 and encoder logic 630. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed.

A MV video stream is provided by a multiview source device 600 to fast motion search logic 620. Multiview source device 600 may capture or store the MV video stream to be encoded. Exemplary multiview source devices include imaging sensors, integrated circuits including imaging sensors, memory devices, and electronic devices capable of storing video, such video cameras, automobile safety cameras, and security systems, tablets, smart phones, gaming consoles, video conferencing systems, television set top boxes, and any other device capable of receiving or generating video. View streams output by multiview source device 600 are downscaled by a multiview downscaler 622 in fast motion search logic 620. As discussed previously, downscaling comprises reducing the resolution of images by a downscale factor. Fast motion search logic 620 also includes a view level motion vector estimator of downscaled views 624 and a motion vector upscaler 626. View level motion vector estimator of downscaled views 624 performs a fast motion search as described previously, where macroblocks of downscaled reference and dependent views are compared to find matches, and determines a downscaled view level motion vector 650 based on a statistical representation of all the MB motion vectors, such as an average or median. Motion vector upscaler 626 then scales-up downscaled view level motion vector 650 and outputs an upscaled view level motion vector 652 to an encoder logic 630. A motion vector refiner 660 may also be provided to perform a motion refinement of upscaled view level motion vector 652.

Encoder logic 630 includes a dependent view encoder 632 and a base view encoder 634. Base view encoder 634 may receive base views including a preceding base view (n−1) and a current base view (n) and encode them in any known or future developed manner. Base view encoder 634 may also compute base view n predicted motion vectors 636 and provide them to dependent view encoder 632 and/or motion vector refiner 660. Motion vector refiner 660 may use base view n predicted motion vectors 636 to perform a motion refinement between a preceding dependent view (n−1) and the next dependent view (n) as described with reference to FIG. 5. Dependent view encoder 632 encodes the dependent view (n) using upscaled view level motion vector 652 in any known or future developed manner. Dependent view encoder 632 may also use base view n predicted motion vectors 636 and a dependent view (n−1) motion vector stored in a dependent view n−1 MV store (memory) 638 during encoding. Fast motion search logic 620 and encoder logic 630 may include additional functionality to perform the method described with reference to FIG. 5.

Figure 7:
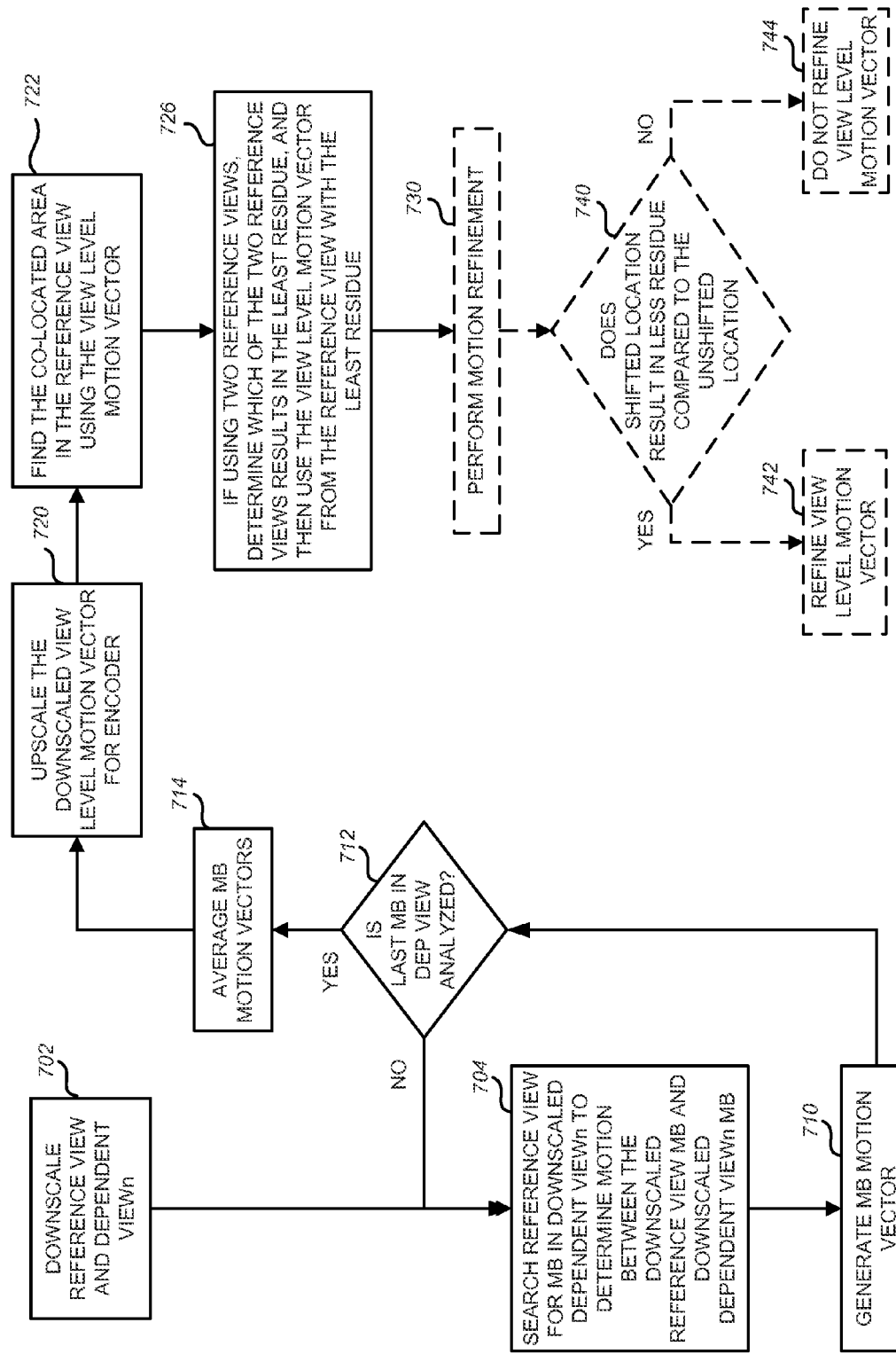
FIG. 7 is a flowchart of another fast motion search and encoding method in accordance with another example set forth in the disclosure.

FIG. 7 is a flowchart of another embodiment of a fast motion search and encoding method. The method may be implemented with fast motion search and encoding logic 610. The method is applicable to conduct fast searches between any two or more views. In this more general sense, a dependent view is the view that will be encoded with the determined motion vector, and a reference view is the view used for the purpose of comparing MBs and determining the motion vector. At 702, the method begins by downscaling the reference view and the dependent view of a MV video stream. In the case two reference views are used, both reference views are downscaled.

At 704, a search is performed in the downscaled reference view for a MB matching a dependent view MB to determine the motion between the downscaled reference view MB and the downscaled dependent view MB. The search may be more effective if it begins at the center of a co-located area, which may comprise multiple macroblocks. However, the search may begin at any suitable location. In one variation, the search is performed in the downscaled dependent view based on a downscaled reference view MB.

At 710, a MB motion vector is generated. The MB motion vector represents the motion between the downscaled reference view MB and the downscaled dependent view MB, determined by a match found by the search. If no shift has occurred, the MB motion vector is null. The search and MB motion vector generation continue for each MB in the downscaled dependent view. At 712, a determination is made whether the last MB has been analyzed. If all the MBs have been analyzed, the MB motion vectors are averaged, at 714, to generate a downscaled view level motion vector, or shift, for the motion vector upscaler. At 720, the downscaled view level motion vector is upscaled to a view level motion vector, or upscaled shift, for the encoder. In the case two reference views are used, MB searching, generation of the downscaled view level motion vector, and upscaling of the view level motion vector are performed for each downscaled reference view, e.g. downscaled base view (n) and downscaled dependent view (n−1).

At 722, the co-located area in the reference view is found using the view level motion vector. In the case two reference views are used, two co-located areas are found using the respective view level motion vectors. At 726, if using two reference views, the pixels of the co-located areas of the reference views are compared to the pixels of the dependent view to determine which of the two reference views has the least residue. The view level motion vector from the reference view with the least residue is used in subsequent steps. In another embodiment, the motion vectors from all the reference views may be combined, e.g. averaged, for subsequent use instead of a least residue motion vector. More generally then, in the case where more than one reference view is used, a view level motion vector is determined from the one or more view level motion vectors corresponding to the more than one reference view.

In a variation of the present embodiment, the view level motion vector may be revised by performing, at 730, a motion refinement. The motion refinement is performed by shifting a co-located reference view area a predetermined shift amount to a shifted location, and then comparing the pixels of a corresponding dependent view area to pixels of the co-located reference view area at the shifted and unshifted locations to determine which of the shifted and unshifted locations results in the least residue. At 740, a determination is made whether the shifted location results in less residue compared to the unshifted location. If the shifted location results in less residue, at 742, the view level motion vector is refined based on the predetermined shift amount. If the shifted location does not result in less residue, at 744, the view level motion vector is not refined. In one example, the predetermined shift amount is a fraction of a pixel, e.g. ¼ pixel. The predetermined shift amount may be selected according to the resolution of the images and the MB sizes. In a further variation, the motion refinement is performed in four directions (left, right, top and bottom). Additional motion refinements may be performed using different predetermined shift amounts of progressively smaller sizes. In a yet further variation, the motion refinement is performed by comparing only pixels near corners of the co-located areas. In one example, pixels near two or more corners are compared.

Figure 8:
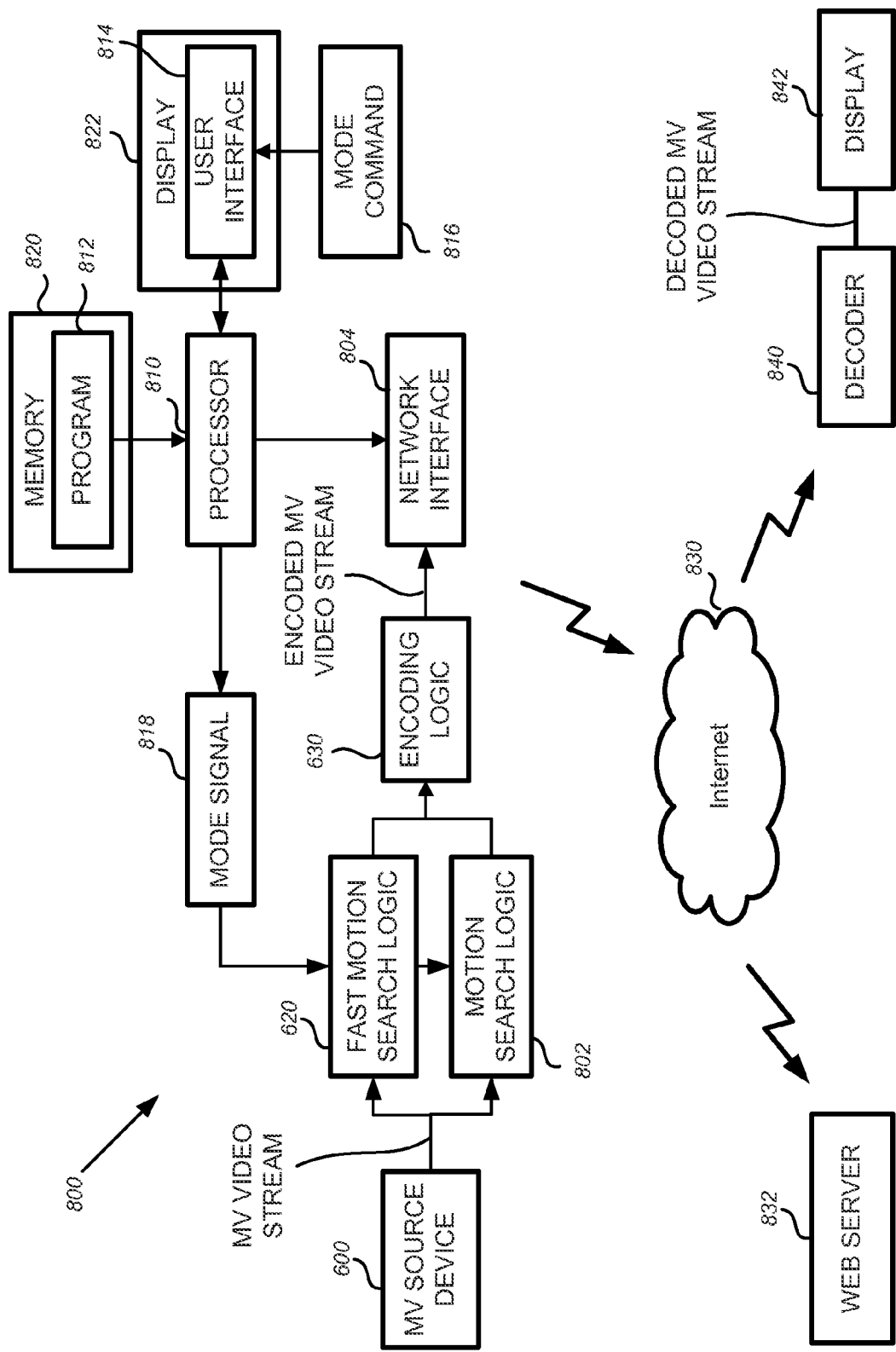
FIG. 8 is a block diagram illustrating a multiview coding apparatus in accordance with a further example set forth in the disclosure.

FIG. 8 is a block diagram illustrating an embodiment of a multiview coding apparatus 800. Exemplary multiview coding apparatus 800 include computing devices, video cameras, automobile safety cameras, and security systems, tablets, smart phones, gaming consoles, video conferencing systems, television set top boxes, and any other apparatus capable of receiving or generating video. The apparatus comprises MV source device 600, fast motion search logic 620, encoding logic 630, and an optional network interface 804. MV source device 600, fast motion search logic 620 and encoding logic 630 are operable as described with reference to FIG. 6 to provide an encoded MV video stream to a display device 822 or a communications interface 804. The apparatus may further comprise motion search logic 802, a processor 810 and a program 812 operable to provide a user interface 814 with which a user can transmit a mode command 816. Program 812 is embedded in a non-transitory storage device such as memory 820 and may be executed by processor 810 to generate, upon receiving mode command 816, a mode signal 818 to select fast motion search logic 620 or motion search logic 802 for generating view level motion vectors for dependent views of the MV video stream. Thereby, the user can choose to encode MV video in a traditional manner, which may be slower and consume more power, or to encode MV video with the fast motion search logic. The encoded MV video stream is then transmitted by communications interface 804 to be decoded by a decoder 840 and presented with a display 842. The encoded MV video stream may be transmitted via a communications network 830 to a web server 832 for storage and subsequent transmission by web server 832 to decoder 840.

The multiview coding apparatus has utility in many environments. In one example, a multiview coding apparatus as described in the preceding paragraph is embodied in a mobile device configured to record the MV video stream and upload the encoded MV video stream to a cloud storage or a social media service. The user may activate mode signal 818 to save battery power and extend the recording time of the mobile device. Exemplary mobile devices include smart phones, tablets, WiFi devices, and portable computers.

The above detailed description of embodiments of the invention and the examples described therein have been presented only for the purposes of illustration and description. It is therefore contemplated that the present invention cover any and all modifications, variations or equivalents that fall within the spirit and scope of the basic underlying principles disclosed above and claimed herein.

What is claimed is:

1. A method for multiview video coding, the method comprising:
    downscaling two views of a multiview video;
    determining a shift between the two downscaled views;
    encoding one of the two views using the shift;
    upscaling the shift; identifying co-located areas of the two views using the upscaled shift; comparing pixels of the co-located areas in a first comparison, shifting one of the co-located areas by a predetermined shift amount; comparing pixels of the other of the co-located areas to pixels of the shifted co-located area in a second comparison; and refining the upscaled shift with the predetermined shift amount if the second comparison results in less residue than the first comparison.

2. A method as in claim 1, wherein the two views include a base view and a dependent view of a multiview image, and wherein encoding one of the two views using the shift includes encoding the dependent view using the shift.

3. A method as in claim 1, wherein the two views include a view from a multiview image and a view from a preceding multiview image.

4. A method as in claim 1, further comprising receiving a mode command from a user and transmitting a mode signal based on the mode command to select between fast motion search logic and another motion search logic, the fast motion search logic configured to downscale the two views, determine the shift between the two downscaled views, and upscale the shift, wherein the fast motion search logic requires less power than the another motion search logic.

5. A method as in claim 1, wherein the shift comprises an inter-view shift, further comprising downscaling a preceding view from a preceding multiview image, determining a predicted shift between the downscaled preceding view and one of the two downscaled views, and determining an optimal shift between the inter-view shift and the predicted shift, wherein encoding one of the two views using the shift comprises encoding one of the two views using the optimal shift.

6. A method as in claim 5, wherein the preceding view is a preceding dependent view, the two views include a dependent view, and the predicted shift comprises a shift prediction between the preceding dependent view and the dependent view.

7. A method as in claim 1, wherein the shift comprises an inter-view shift, further comprising identifying co-located areas of the two views using the inter-view shift, and identifying a corresponding co-located area of a downscaled preceding view of a preceding multiview image.

8. A method as in claim 7, further comprising upscaling the inter-view shift, wherein using the inter-view shift comprises using the upscaled inter-view shift.

9. A method as in claim 7, further comprising determining a predicted shift between another downscaled preceding view of the preceding multiview image and one of the two downscaled views; and using the predicted shift to identify the corresponding co-located area.

10. A method as in claim 7, wherein identifying a corresponding co-located area comprises determining motion vectors of macroblocks; and averaging the macroblock motion vectors.

11. A method as in claim 7, wherein each of the two views has a total area, and the co-located areas are smaller than the total area of each of the two views.

12. A method as in claim 1, wherein comparing pixels comprises comparing only pixels located near corners of at least one of the co-located areas.

13. A method as in claim 1, wherein the predetermined shift amount is less than a pixel.

14. A method as in claim 1, wherein the shifted co-located area corresponds to a base view.

15. A method as in claim 1, further comprising obtaining, with a multiview source device, the multiview video.

16. A method as in claim 15, wherein the multiview device includes a display device and a user interface, further comprising receiving a mode command with the user interface and, responsive to the mode command, encoding the multiview video with one of fast motion search logic and another motion search logic, wherein the fast motion search logic downscales the two views, determines the shift between the two downscaled views, and encodes one of the tow views using the shift.

17. An apparatus for encoding multiview video, the apparatus comprising:
fast motion search logic operable to downscale two views of the multiview video and determine a shift between the two downscaled views;
encoder logic configured to encode one of the two views using the shift;
a motion vector upscaler configured to generate an upscaled shift by upscaling the shift; and
a motion vector refiner configured to refine the upscaled shift to improve the quality of the encoded view, wherein the motion vector refiner is configured to refine the upscaled shift by identifying co-located areas of the two views using the upscaled shift; comparing pixels of the co-located areas in a first comparison; shifting one of the co-located areas by a predetermined shift amount; comparing pixels of the other of the co-located areas to pixels of the shifted co-located area in a second comparison; and refining the upscaled shift with the predetermined shift amount if the second comparison results in less residue than the first comparison.

18. An apparatus as in claim 17, further comprising an integrated circuit, wherein the fast motion search logic is included in the integrated circuit.

19. An apparatus as in claim 17, further comprising a user interface configured to receive a mode command from a user and select, responsive to the mode command, between the fast motion search logic and another motion search logic, the fast motion search logic consuming less power than the another motion search logic.

20. An apparatus as in claim 17, wherein the shift comprises an inter-view shift, and the fast motion search logic is configured to downscale a preceding view from a preceding multiview image, determine a predicted shift between the downscaled preceding view and one of the two downscaled views, and determine an optimal shift between the inter-view shift and the predicted shift, wherein using the shift comprises using the optimal shift.

21. An apparatus as in claim 17, wherein the motion vector refiner is configured to compare only pixels located near corners of at least one of the co-located areas.

22. An apparatus as in claim 17, wherein the predetermined shift amount is less than a pixel.

23. An apparatus as in claim 17, further comprising a multiview source device operable to capture or generate the multiview video.

24. An apparatus as in claim 23, wherein the multiview source device is selected from a group comprising a computing device, a video camera, an automobile safety camera, a security system, a tablet, a smart phone, a gaming console, a video conferencing system, a television set top box, and an apparatus capable of receiving or generating video.

25. An integrated circuit for use in encoding a multiview video, the integrated circuit comprising:
fast motion search logic operable to downscale two views of the multiview video and determine a shift between the two downscaled views;
encoder logic configured to encode one of the two views using the shift;
a motion vector u scaler configured to generate an upscaled shift by upscaling the shift; and
a motion vector refiner configured to refine the upscaled shift to improve the quality of the encoded view, wherein the motion vector refiner is configured to refine the upscaled shift by identifying co-located areas of the two views using the upscaled shift, comparing pixels of the co-located areas in a first comparison; shifting one of the co-located areas by a predetermined shift amount comparing pixels of the other of the co-located areas to pixels of the shifted co-located area in a second comparison; and refining the upscaled shift with the predetermined shift, amount if the second comparison results in less residue than the first comparison.

26. An integrated circuit as in claim 25, further comprising an imaging sensor operable to capture the multiview video.

27. A non-transitory computer readable medium comprising executable instructions that when executed by an integrated circuit fabrication system, cause the integrated circuit fabrication system to produce an integrated circuit that comprises:
fast motion search logic operable to downscale two views of the multiview video and determine a shift between the two downscaled views;
encoder logic configured to encode one of the two views using the shift;
a motion vector upscaler configured to generate an upscaled shift by upscaling the shift; and
a motion vector refiner configured to refine the upscaled shift to improve the quality of the encoded view, wherein the motion vector refiner is configured to refine the upscaled shift by identifying co-located areas of the two views using the upscaled shift; comparing pixels of the co-located areas in a first comparison; shifting one of the co-located areas by a predetermined shift amount; comparing pixels of the other of the co-located areas to pixels of the shifted co-located area in a second comparison and refining the upscaled shift with the predetermined shift amount if the second comparison results in less residue than the first comparison.

* * * * *